Patented Nov. 22, 1949

2,489,225

UNITED STATES PATENT OFFICE 2,489,225

INSOLUBILIZATION OF CELLULOSE ETHERS AND ESTERS

Elton K. Morris, Midland, Mich., assignor to The Dow Chemical Company, Midland, Mich., a corporation of Delaware No Drawing. Application August 7, 1947, Serial No. 767,358

2 Claims. (Cl. 260—230)

This invention relates to a method for converting cellulose ethers and esters which are soluble in organic solvents into a form which is insoluble in most such solvents.

It is often desirable to convert films, sheets, coatings, and extruded or molded articles to a form or condition in which they are highly resistant to organic solvents. Some of these articles, however, are most commonly prepared by deposition of the film-forming material from a solution thereof in an organic solvent. Hence, it is necessary in many cases that the insolubilizing treatment follow the shaping operation. Such treatment, in the past, has most commonly involved a baking operation which has served to harden a resinous ingredient of the composition. Baking operations, however, cannot be applied to all types of articles, and it is not always desirable to modify the plastic substance by inclusion of a thermosetting resin in the composition. A method is desired whereby normally soluble compositions and articles of the typical cellulose ether and ester plastics may be rendered insoluble by a treatment at or near room temperature, which method is independent of the specific modifiers which may be in the composition. It is desirable as well that such method reduce the plasticity of the article.

It is among the objects of the present invention to provide a method for converting cellulose ethers and esters which are normally soluble in organic solvents to a condition in which they are practically insoluble in such solvents. A particular object is to provide such a method which does not require a baking operation and does not require the presence of particular types of modifying ingredients in the initial plastic composition. It is a further object to provide a method for converting the thermoplastic cellulose ethers and esters to a substantially infusible form. Other and related objects may appear hereinafter.

The foregoing objects have now been found to be attained by a treatment of the cellulose derivative with phosphorus trichloride, and, if desired, by a two-step treatment with such chloride and an amine, as will be more fully described. The cellulose derivative may be any thermoplastic cellulose ether or ester which is less than fully substituted, i. e. one which contains residual hydroxyl groups. The amine, when used, may be ammonia or any compound containing the group —NH$_2$ or the group =NH. Of these, the various primary amines are preferred because of the greater extent to which they produce the desired effects, and, for reasons of economy, those containing 1 to 3 carbon atoms in an aliphatic radical attached to the nitrogen atom are the most practical.

When the two-step treatment is employed it is more convenient to carry out the reaction employing the phosphorus trichloride in the first step and the amine in the second step of the treatment, but the order of treatment may be reversed if the amine is allowed or is able to penetrate the cellulose derivative before exposure of the intermediate product to the action of the phosphorus trichloride, and in some cases the treated product may be more insoluble and infusible than with the first suggested order of treatment.

In carrying out the process of the invention, any of several modes of treatment may be used, and on any of several forms of the cellulose derivative. The latter may be in the form of powder, flakes, granules, solutions, filaments, fine fibers, films, applied coatings, or certain molded articles. The reagents, often employed at room temperature and seldom above 40° C., may be applied directly in undiluted form to the solid forms of the cellulose derivative, or they may be added to a solution of the cellulose ether or ester in a solvent which does not react with the phosphorus chloride or with the amine. Preferably, however, the reagents are first dissolved in a non-reactive solvent therefor, and are then brought into intimate contact with the cellulose ether or ester. When the cellulose derivative being treated is in a solid (rather than a dissolved) condition, the phosphorus trichloride is allowed to remain in contact with the cellulose derivative until the latter has been well penetrated by the reagent. This is usually accomplished in from 10 seconds to 5 minutes, and contact times of about 1 minute are usually sufficient when the treating agent is in liquid phase. Somewhat longer exposure times are necessary when treating with phosphorus trichloride vapor. Any excess amounts of the chloride may then be removed by washing the so-treated solid form of the cellulose derivative with an inert solvent for the phosphorus trichloride, such, for example, as toluene, ethylene chloride, carbon tetrachloride, or the like. When both types of reagents are to be employed, the second stage of the process may then be effected by bringing the treated cellulose ether or ester into similar intimate contact with the amine, usually at or near room temperature, and usually in quantity at least equivalent to from one-half to one nitrogen atom for each chlorine in the phosphorus trichloride used in the first stage. After the reaction is complete, which may require from 1 to 15 minutes, any excess amine may be removed by washing the now-insoluble cellulose derivative in any solvent for the amine or its hydrochlorides which is non-destructive of the cellulose derivative. For this purpose the solvents named above may be used, as may various alcohols, such as methanol or ethanol, and water. For most purposes it is necessary to apply the two-stage treatment to a fabricated form of the cellulose ether or ester, such as a molded or extruded article or a film or applied coating, since the treatment not only makes the product insoluble in most common organic solvents but also renders it infusible, or nearly so, and the usual methods of fabrication or application can no longer be used.

No baking treatment is required in the present process, to effect insolubilization of the cellulose ether or ester, as is required when insolubility is contributed to such ethers and esters by thermoset resins in the manner known in the art. When the article being treated is a cellulose derivative film, and especially when the temperature employed during the treatment is significantly above room temperature, the film may become somewhat wrinkled by the chemical treatment, and smoothness may be restored by a pressure calendering operation, the temperature of which may be varied somewhat but will usually lie in the range between 60° and 100° C.

The following examples illustrate the practice of the invention, but are not to be construed as limiting the same to the specific embodiments shown:

Example 1

An ethyl cellulose having about 2.46 etherifying groups per $C_6$ unit (48 per cent ethoxyl), which was readily soluble in organic solvents to form clear solutions, was dissolved to produce 5 and 10 per cent solutions in toluene. To these solutions were added solutions of similar concentrations of phosphorus trichloride in toluene at room temperature (about 25° C.). Within two minutes the mixed solutions had set to stiff, clear and glassy gels which gradually underwent synaeresis, expressing some of the toluene. The gel was dried in a stream of warm air at 60° C. The product was washed thoroughly with water to remove any excess phosphorus trichloride, and was dried again. There was obtained a white, granular material which was insoluble in the common organic solvents, including hot toluene, ethylene chloride, acetone, ethanol, and mixtures thereof, in all of which the original ethyl cellulose had dissolved readily. The white, granular product was swollen somewhat by some of the test liquids. It could only be molded or otherwise shaped under heat and pressure with extreme difficulty, and only then to form articles whose preparation required little plastic flow.

Example 2

A dry, granular form of the same ethyl cellulose whose solution was employed in Example 1, was mixed with 10 per cent of its weight of undiluted phosphorus trichloride. After 5 minutes the remaining liquid was poured away from the granules which were washed with acetone and then with water to remove any unreacted phosphorus trichloride. After drying, the granules were found to be practically infusible, and were both insoluble in and only slightly swollen by the usual solvents for ethyl cellulose.

Example 3

A film 0.001 inch thick and a sheet 0.01 inch thick, composed of ethyl cellulose having an ethoxyl content of 46.5 per cent, were each immersed in a 10 per cent solution of phosphorus trichloride in toluene. After 10 minutes the sheets were removed from the treating bath, rinsed with fresh toluene, and were then immersed in a 10 per cent solution of ethylene diamine in toluene for 15 minutes. Thereafter, the sheets were rinsed with acetone and washed with water to remove any excess reagents and water-soluble salts, and were dried. The products were insoluble in the usual organic solvents for ethyl cellulose, and were not swollen by those solvents to any appreciable extent. While the original sheets could be pressed easily into other shapes by drawing or molding operations at temperatures near 130° C., the treated products could not be thermally softened at temperatures up to 180° C.

Example 4

The process outlined in Example 3 was applied to granular ethyl cellulose, the reagents used being 10 per cent solutions of phosphorus trichloride in toluene and of isopropyl amine, in one case, and diethyl amine, in another. The granules became insoluble in solvents for ethyl cellulose, and could no longer be used for making flow moldings, due to their relative infusibility.

Example 5

Some of the same batch of ethyl cellulose as that used in Example 1 was dissolved to form a 10 per cent solution in toluene. There was added a 10 per cent solution in toluene of ethylene diamine. After 6 hours there was still no physical change apparent in the mixed solution. There was then added an equal volume of a 10 per cent solution in toluene of phosphorus trichloride. Instead of forming a gel, as in Example 1, an insoluble granular porous mass separated from the liquid medium. This mass, when washed and dried, was unaffected by all common organic solvents.

Example 6

In a manner similar to that given in Example 3, molded sheets of cellulose acetate, plasticized with the monobutyl ether of diethylene glycol or with the triacetyl ester of glycerol, were treated successively with carbon tetrachloride solutions of phosphorus trichloride and of ethylene diamine. After treatment, the washed and dried product was essentially unaffected by boiling acetone, ethylene chloride, ethyl acetate, methyl ethyl ketone, and other common solvents for cellulose esters. The product could not be further molded by heat and pressure to form useful articles.

Example 7

When cellulose acetate, containing about 0.5 residual hydroxyl group per $C_6$ unit, is dissolved in ethylene chloride and treated with a solution of phosphorus trichloride, in the manner described in Example 1 with respect to ethyl cellulose, a gel is formed promptly, and synaeresis occurs, as described. When the product is separated and washed, it is found to be insoluble in ethylene chloride, alcohol, toluene or acetone, but may be molded at or near 170°–180° C.

Example 8

A molding grade of R. S. nitrocellulose was dissolved in acetone and treated with phosphorus trichloride, whereupon a stiff gel was formed. The gel was separated from supernatant liquor, was washed with acetone, then with water, and dried. The product was swelled by, but did not dissolve in any of the usual solvents for nitrocellulose.

In a manner similar to that described above, the water-soluble cellulose ethers, including methyl cellulose, hydroxyethyl cellulose and carboxymethyl cellulose, may be rendered insoluble in water by treatment with phosphorus trichloride. The same result is obtained when polyvinyl alcohol, another long chain hydroxylated polymer, is treated with phosphorus trichloride.

While each of several other acidic chlorides effects a reduction in the solubility of cellulose ethers and esters, none of them is more effective than phosphorus trichloride, so far as is now known, and most of them are unsatisfactory for one reason or another. Thus, while many inorganic chlorides or bromides of acidic reaction can cause solutions of cellulose ethers or esters to gel, the product is but partially insoluble, being swollen by contact with solvents. Neutral inorganic chlorides are ineffective. Among the compounds tested are silicon tetrachloride, aluminum chloride, antimony trichloride, ferric chloride, zinc chloride, phosphorus monochlorodibromide and dichloromonobromide, chromic chloride, stannous chloride, mercuric chloride, bismuth chloride, phosphorus oxychloride, antimony tribromide, and the like. Of these, the one which is apparently most nearly comparable with phosphorus trichloride in the results obtained is silicon tetrachloride, yet even this reagent is not as effective as phosphorus trichloride.

Many of the inorganic chlorides such as antimony pentachloride, stannic chloride or titanium tetrachloride, which are normally characterized as strong oxidizing agents, are found to exhibit a strong initial insolubilizing or gelling effect when first added to solutions of cellulose ethers or esters. However, after a short period of standing, the oxidizing property of these agents takes effect on the gel to bring about a re-solution of the gel. Phosphorus trichloride is then found no longer to have any insolubilizing effect on this redissolved material.

When the treatment includes the use of a basic nitrogen compound containing the —$NH_2$ or the =NH group, the product is always more resistant to darkening on prolonged exposure to elevated temperatures than when only phosphorus trichloride is used as a reagent, and in some cases the two-stage treatment provides a more insoluble product than that resulting from treatment with phosphorus trichloride alone. Since no significant difference in results is noticed when using the various primary and secondary basic nitrogen compounds, the more common ones will ordinarily be employed. These include, but are not limited to, ammonia, mono- and dimethyl amine, mono- and diethyl amine, isopropyl amine, ethylene diamine, n-butyl amine, aniline, and the like.

The invention finds utility in the after-treatment of films and sheeting; filaments, fibers, thread and yarn; coated surfaces; molded articles of thin section; and numerous other articles fabricated from the cellulose ethers and esters. In one practical application, a table top coated with an ethyl cellulose lacquer to make it resistant to alkalies is treated with phosphorus trichloride to make the surface resistant to the action of organic solvents. In another application, cellulose ether or cellulose ester filaments are extruded into a coagulating bath containing phosphorus trichloride to render the filaments insoluble in organic solvents, or the filaments may be dry-spun and then given a treatment with the insolubilizing agent, with or without further treatment with ammonia or other of the defined basic nitrogen compounds.

I claim:

1. The method which consists essentially in bringing a material selected from the class consisting of the thermoplastic ethers and esters of cellulose, which are soluble in organic solvents to form clear solutions but in which the cellulose molecule contains unesterified and unetherified hydroxyl groups, into intimate contact, at a temperature not exceeding 40° C., with at least 10 per cent of its weight of phosphorus trichloride, bringing the resultant product into intimate contact with a compound selected from the group consisting of the primary and secondary aliphatic amines having from 1 to 3 carbon atoms, inclusive, removing water-soluble reaction products, and drying the resulting product which is substantially insoluble in those organic solvents in which the untreated cellulose derivative is soluble.

2. The method which consists in immersing thermoplastic ethyl cellulose, which is less than fully ethylated and is soluble in organic solvents to form clear solutions, in a 5 to 10 per cent solution of phosphorus trichloride in toluene at a temperature not exceeding 40° C., adding an amount of ethylene diamine, at least equivalent to from ½ to 1 nitrogen atom for each chlorine in the phosphorus trichloride previously employed, and thereafter freeing the so-treated ethyl cellulose from excess reagents and from water-soluble reaction products, and drying the product which is substantially insoluble in those solvents in which the untreated ethyl cellulose is soluble.

ELTON K. MORRIS.

REFERENCES CITED

The following references are of record in the file of this patent:

UNITED STATES PATENTS

| Number | Name | Date |
|---|---|---|
| 2,170,017 | Frey | Aug. 22, 1939 |

FOREIGN PATENTS

| Number | Country | Date |
|---|---|---|
| 620,300 | Germany | Oct. 18, 1935 |